March 16, 1971  HEIJIRO SHIGUMA  3,570,291
METHOD OF MANUFACTURING EXTENSION SPRINGS
Filed Oct. 7, 1968  7 Sheets-Sheet 1

Heijiro Shiguma
*INVENTOR.*

BY George B. Oujerole
*Attorney*

United States Patent Office 3,570,291
Patented Mar. 16, 1971

3,570,291
METHOD OF MANUFACTURING EXTENSION SPRINGS
Heijiro Shiguma, Yokohama-shi, Japan, assignor to NHK Spring Co., Ltd., Yokohama, Japan
Filed Oct. 7, 1968, Ser. No. 765,405
Int. Cl. B21f *3/04*
U.S. Cl. 72—142     4 Claims

ABSTRACT OF THE DISCLOSURE

A circular section spring steel wire is wound around a mandrel in such a way that adjacent turns of the spring steel wire on the periphery of the mandrel are in close contact with each other and are simultaneously twisted in such a direction of rotation that the spring steel wire turns on the mandrel when it is wound on the mandrel, the result of a great amount of initial tension being imparted to the extension spring.

BACKGROUND OF THE INVENTION

This invention relates to the method of manufacturing extension springs having initial tension and a coiling device therefor.

It has been known that when a circular section spring steel wire is wound around a mandrel in such a way that adjacent turns of the spring steel wire on the periphery of the mandrel are in close contact with each other, a wound portion of the spring steel wire at rest is pressed against a side of a preceding wound portion in such a way as to supply the spring steel wire to the mandrel that a delivery line of the spring steel wire drawn from a delivery reel to the mandrel is normal to the axis of the mandrel while tilting toward the preceding wound portion and simultaneously is imparted with a tension stress.

It has then been known from experience that an extension spring is imparted with an intial tension by such winding, the amount of the initial tension depending on a winding angle between the delivery line of the spring steel wire and the axis of the mandrel, and on the amount of the tension stress imparted to the spring steel wire.

There is as yet no proper theoretical explanation with regard to the manner of imparting the initial tension into the extension spring by such winding.

In fact there is developed hereafter a hypothesis by the present inventor so as to better explain this invention. Namely, when the spring steel wire is wound around the mandrel torsion stress is generated in the spring steel wire, but changes shape over the elastic limit so that a little amount of the stress remains before annealing and thereafter is almost removed. It is however supposed that when wound in such a winding as hereinbefore described, the extension spring retains a torsion stress which acts as an initial tension. In other words, as shown in FIG. 1, when the tension stress is supplied to the delivery line of the spring steel wire to cause a force F to act against the preceding wound portion of the spring steel wire with tilting at an angle $\theta$ along a vertical section normal to the axis of the mandrel, the force F is separated into a force $f_1$ which acts vertically to a surface of the mandrel and a force $f_2$ which acts vertically to a surface of the preceding wound portion so that there results a torsional moment $M_2$ which is generated in the winding portion of the spring steel wire at rest. The moment $M_2$ acts in a clockwise portion with respect to the axis of the preceding wound portion and its value is $$M_2 = \mu \cdot f_1 \cdot r$$

Wherein $\mu$ is a modulus of sliding friction and $r$ is a radius of the normal section of the spring steel wire. A torsional moment $M_1$ which generates in the spring steel wire when it is wound around the mandrel acts in a counterclockwise portion with respect to the axis of the instantaneous winding portions. It is therefore believed that a torsion stress which is defined by a value of $M_1 - M_2$ is retained in the spring steel wire. The direction of the retained stress is the same as that in which the spring steel wire turns around the mandrel so that the stress acts as an initial tension in such a direction that the extension spring tends to shrink.

The amount of the initial tension is thus limited by the angle $\theta$ and contact force $f_1$. But it is appreciated that winding operation is impossible at an angle of more than 45° and the angle is further broadened in connection with decreasing the spring index $D/d$, wherein D is a coil diameter and $d$ is the diameter of the spring steel wire, in spite of the fact that the more the spring index $D/d$ is decreased, the more the initial tension is increased in conventional methods.

SUMMARY OF THE INVENTION

An object of this invention is to provide a method of manufacturing an extension spring characterized by the steps of winding a spring steel wire around a mandrel and simultaneously imparting a torsion stress in such a direction of rotation that it is the same as that in which the spring steel wire is wound around the mandrel, the result of a great initial tension remaining in the extension spring.

Another object of this invention is to provide a coiling device for manufacturing extension springs, comprising a mandrel assembly having a body, a rotatable mandrel which is rotatably mounted on a bearing secured on said body and driving means by which the mandrel is driven, a reel assembly having a stand, a rotatable frame which is rotatably mounted on the stand and spaced to the mandrel and a reel which is rotatably mounted on said rotatable frame, and means for imparting the torsion stress to the spring steel wire, wherein the axis of the rotatable frame is substantially arranged in a direction perpendicular to the axis of the mandrel, and the rotatable frame has a delivery port positioned on its axis at the end of said frame facing to said mandrel so that the spring steel wire which is contained in the steel is imparted with a torsion stress in series by rotating the frame by the means when it is proceedingly wound on the mandrel through the delivery port.

According to the coiling device of this invention, said means for imparting torsional moment in the spring steel wire may be formed into a gearing means which causes the rotatable frame to rotate in cooperation with the reel in a speed ratio, a rotation of the reel depending on the unwinding speed from the reel by the rotation of the mandrel.

DETAILED DESCRIPTION OF THE INVENTION

Figure 1:
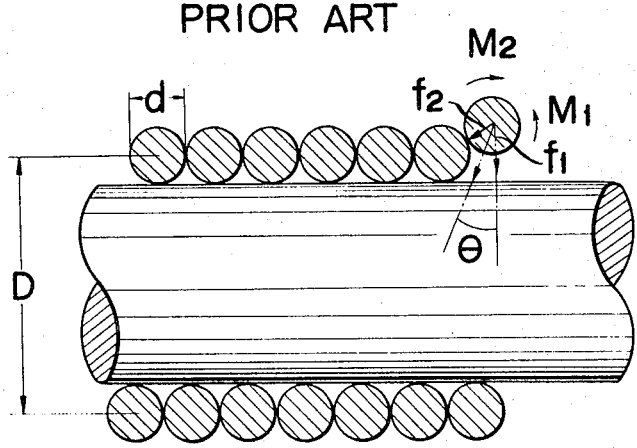
FIG. 1 is a sectional view illustrating a mandrel and a spring steel wire wound about the mandrel to explain the conventional method described, for readily imparting initial tension into the extension spring product.
Figure 2:
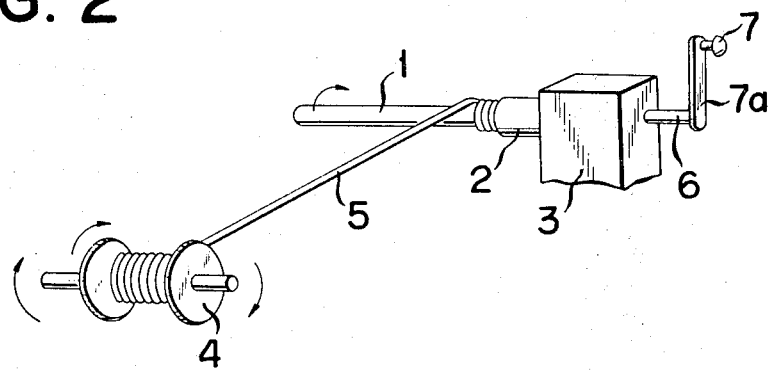
FIG. 2 is a perspective view illustrating the process for winding the spring steel wire according to this invention.
Figure 3:
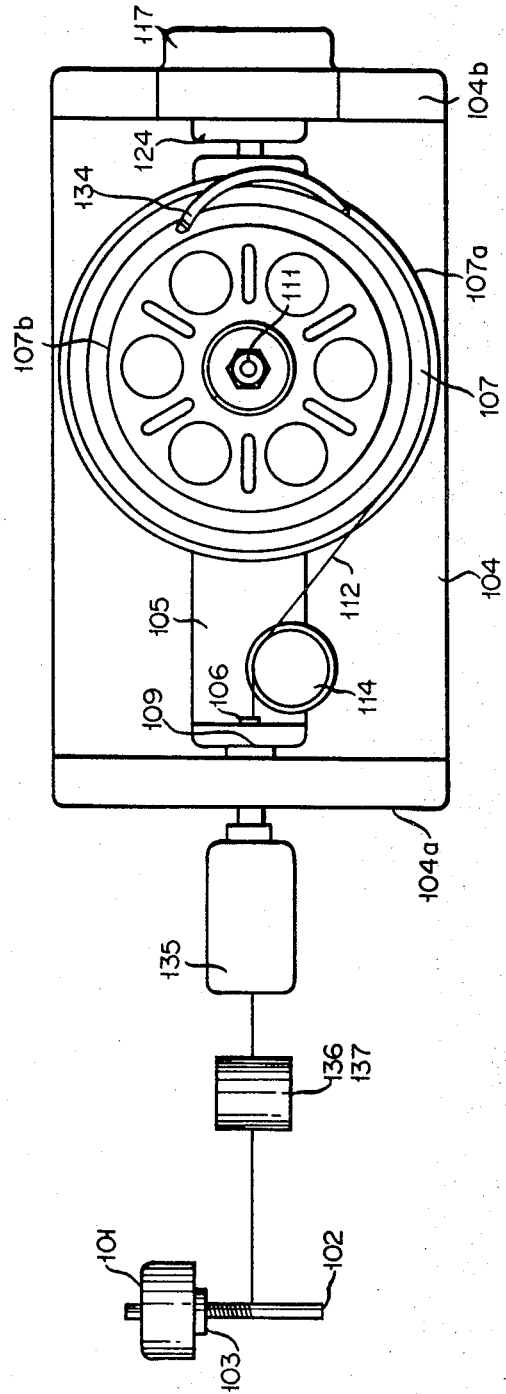
FIG. 3 is a plan view illustrating a coiling device according to one embodiment of this invention.
Figure 4:
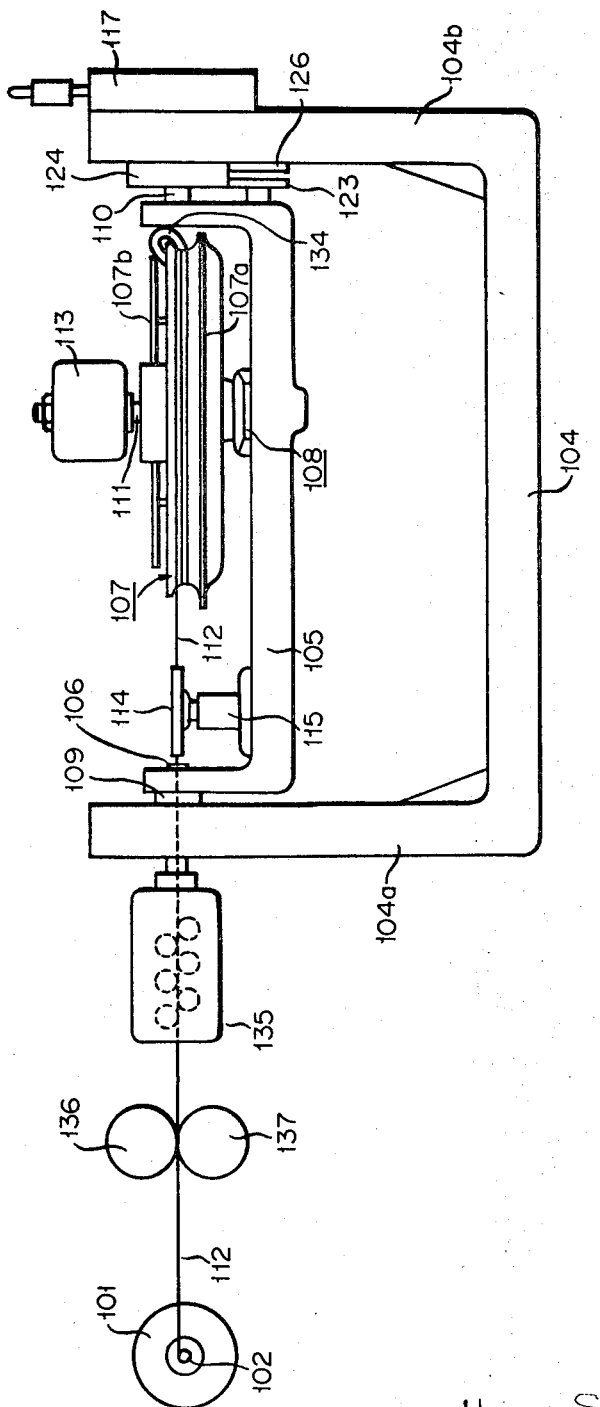
FIG. 4 is an elevational view illustrating the coiling device shown in FIG. 3.
Figure 5:
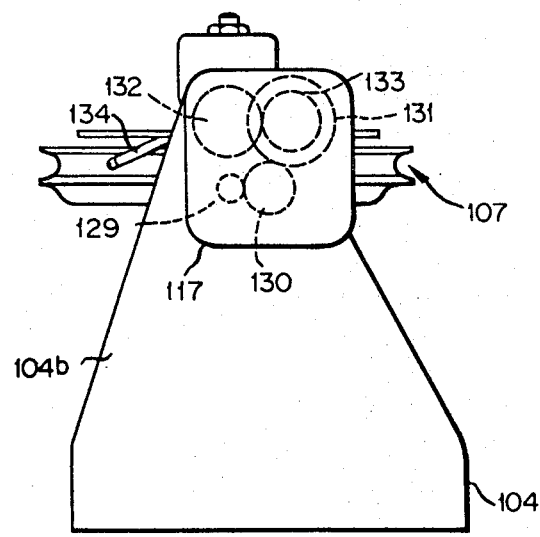
FIG. 5 is a side elevational view illustrating the coiling device shown in FIG. 3.

Referring to FIG. 2, there is a mandrel assembly having a body 3, a bearing 2 and a rotatable mandrel 1 rotatably disposed on the bearing 2, and a reel assembly having a reel 4 which is spaced from the mandrel and contains a spring steel wire 5. The mandrel assembly is further provided with a handle shaft 6, a handle arm 7a secured to one end of the handle shaft and a handle 7 mounted on the handle arm, the handle shaft 6 being connected to the mandrel. At the beginning, the spring steel wire 5 is drawn from the reel to the mandrel and the preceding end of the spring steel wire is rigidly wound around the mandrel as shown in FIG. 2. In the next place, the spring steel wire is twisted in a clockwise direction by rotating the reel 4 around an axis of the spring steel wire drawn in straight and simultaneously wound in series by rotating the mandrel and the handle shaft in a clockwise direction by operating the handle.

In this case, adjacent turns of the spring steel wire is close to each other. After the coiling is finished, the wound spring steel wire which is shaped into a coil spring is removed from the mandrel and the preceding end of the spring steel wire is cut. Both ends of the spring steel wire are formed into hooks before low temperature annealing as shown in FIG. 9.

Spring semi-products made by such a way are respectively measured in respect of the load-deflection before low temperature annealing. Further, the spring semi-products are again measured as the completed products in relationship with load-deflection after low temperature annealing. The result of the practical observation effects as shown in FIGS. 7 and 8 is obtained.

Figure 7:
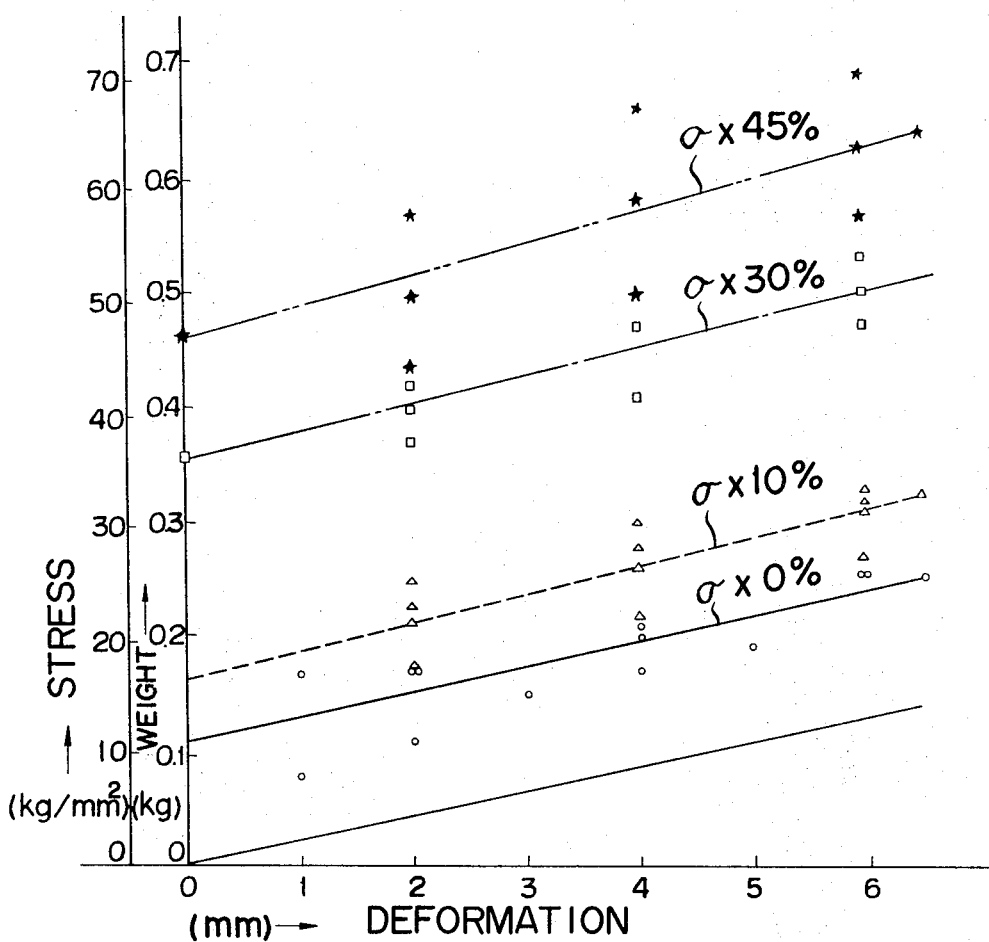
FIG. 7 is a practically observation graph indicating tension stress and load-deflection according to the spring products made by the process of this invention before low temperature annealing.
Figure 8:
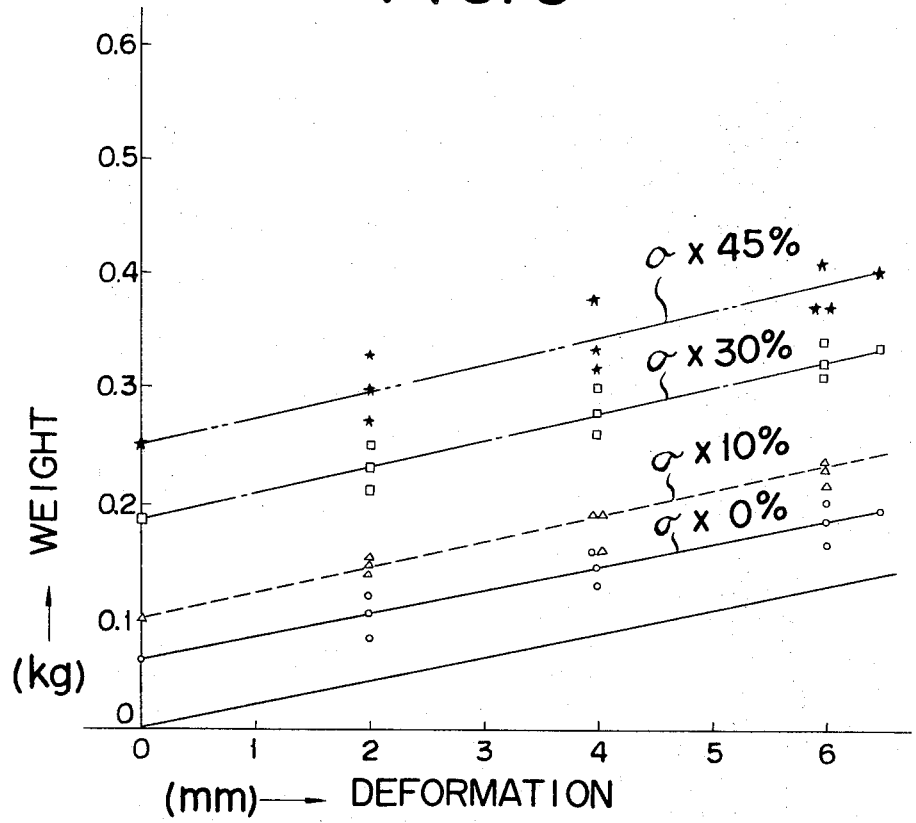
FIG. 8 is a practical observation graph indicating tension stress and load-deflection according to the spring products after low temperature annealing.

Lines plotted in FIGS. 7 and 8 show how much deflection of the spring semi-product or the spring product generates in correspondence with any load when certain given torsion stress is imparted into the spring steel wire during the coiling.

Figure 9:
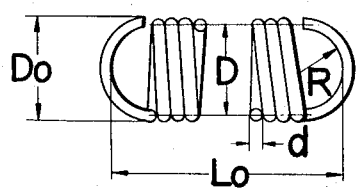
FIG. 9 is a view illustrating the spring product obtained according to the method of this invention.

The spring products or semi-products utilized in this experiment consist of 0.65 to 0.95 percent by weight of carbon, 0.12 to 0.30% by weight of silicon, 0.30 to 0.90% by weight of manganese, less than 0.30% by weight of phosphor, less than 0.30% by weight of sulphur and less than 0.20% by weight of copper, and are further dimensioned such that the diameter of the spring steel line $d$ is 0.5 mm., the diameter of the coil D is 4.8 mm., the free length of the spring product Lo is 18.8 mm., the radius of the hook R is 2.15 mm., coil turns N is 28 and the outside-diameter of the coil Do is 5.3 mm., as shown in FIG. 9.

The angle of torsion imparted to the spring steel wire is calculated by the formula indicated below.

$$\phi = \frac{Z.L.\tau}{G.d}$$

wherein, $\phi$: angle of torsion (radian)
L: length of the spring steel line (mm.)
$\tau$: torsion stress (kg./mm.²)
G: modulus of transverse elasticity (kg./mm.²)
$d$: the diameter of the spring steel wire (mm.)
Z: modulus of section.

The modulus of transverse elasticity G of each of the test pieces of the spring products utilized for measurement is 8,400 kg./mm.² when the diameter of the spring steel wire $d$ is 0.5 mm. As shown in FIGS. 7 and 8 and explained under descriptions hereafter by a detailed table, it is appreciated that the initial tension of each of the test pieces is varied in accordance with the strength of the torsion stress which is put into each of the test pieces when it is applied to one of the tensile strengths of 0%, 10%, 30% and 45%.

| | $\sigma$ | | | |
|---|---|---|---|---|
| Torsion stress | 0% | 10% | 30% | 45% |
| Initial tension (kg.): | | | | |
| Before annealing | 0.11 | 0.165 | 0.355 | 0.46 |
| After annealing | 0.0625 | 0.1 | 0.185 | 0.25 |

Wherein $\sigma$ shows the tensile strengths of the test pieces of the spring products.

It is now appreciated that when strengths of the torsion stresses are respectively applied to one of the tensile strengths of 10%, 30% and 45%, the spring products according to this invention are respectively kept at an initial tension which has a higher strength than that of the initial tension of the prior spring products being in such a condition that the strength of the torsion stress is applied to a tensile strength of 0%. For instance, the former has the fourfold strength than that of the latter when the coiled spring steel wire is not yet annealed at low temperature conventionally utilized or has twice the strength than that of the latter when the coiled spring steel wire is already annealed at the low temperature.

Referring to FIG. 3 to FIG. 6, a coiling device according to this invention comprises a mandrel assembly, a reel assembly and means for imparting the torsional moment into the spring steel wire. The mandrel assembly has a body 101, and a rotatable mandrel 102 rotatably mounted on a bearing 103, which is secured on the body. The reel assembly for supplying the spring steel wire to the mandrel consists of a stand 104, a rotatable frame 105 which is rotatably mounted on the stand and spaced from the mandrel and a reel 107 which is rotatably mounted on the frame 105. The axis of the rotatable frame is substantially aligned in a perpendicular direction of the axis of the mandrel and a pair of shafts 109 and 110 are protruded on sides of the frame 105 and positioned on the axis of the frame. The rotatable frame provides a delivery port 106 which is positioned on the axis of the frame at the end of the frame facing to said mandrel. The stand 104 has a pair of raised portions 104a and 104b, between which the rotatable frame 105 is rotatably mounted by means of the shafts 109 and 110. To support the reel 107 on the frame 105, a shaft 111 of the reel is mounted on the frame at its medium portion and arranged in a perpendicular direction of the horizontal axis of the frame. The reel 107 is rotatable around the shaft 111 and consists of an external reel 107a and an internal reel 107b which contains a spring steel wire 112. A balance weight 113 is secured on said shaft 11 at its end to situate the center of gravity of all of the rotatable frame, the reel and the balance weight on the horizontal axis.

Figure 6:
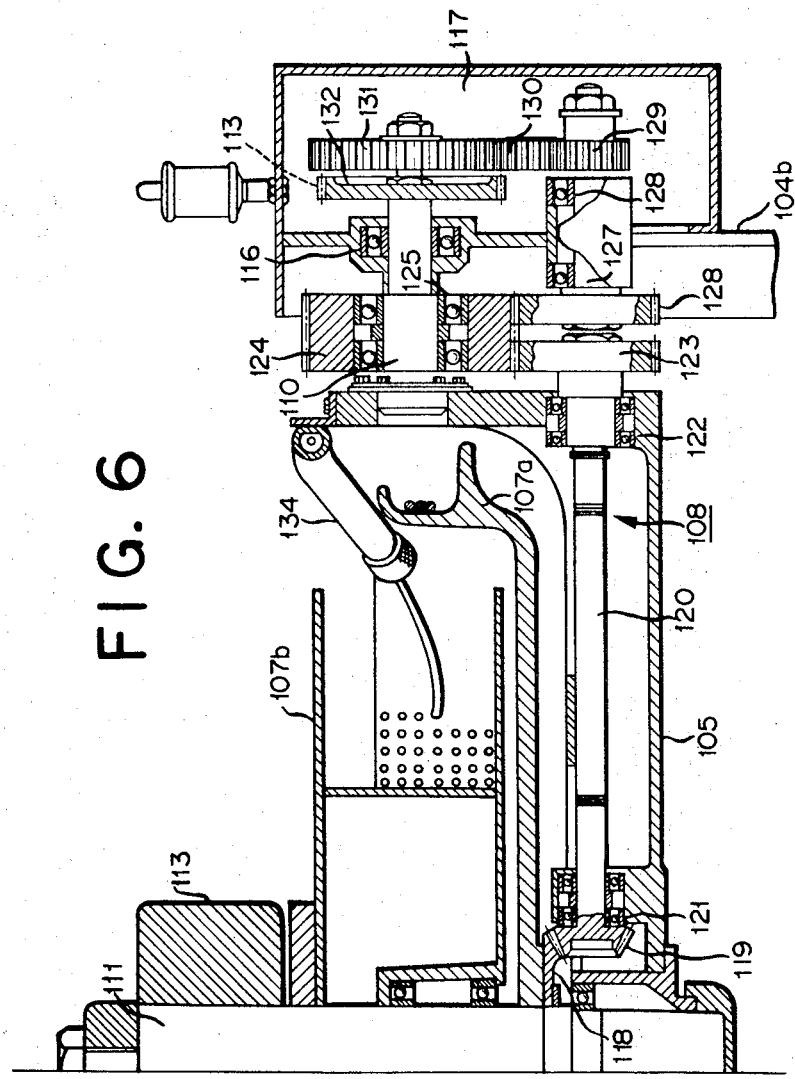
FIG. 6 is a vertical sectional view in part, illustrating the coiling device shown in FIG. 3.

A guide reel 114 is rotatably mounted on a support 115 mounted on the rotatable frame 105 near the delivery port 106, and arranged in parallel to the shaft 111. The shaft 110 is borne on a bearing 116 mounted on the raised portion 104b, the bearing 116 being covered by a gear box 117 secured on the raised portion 104b. Means 108 for imparting torsional moment in the spring steel wire consists of bevel gears 118 and 119, transmitting shafts 120 and 127, a pair of bearings 121 and 122, spur gears 123, 126, 129, 130, 131, 132 and 133, a broad width spur gear 124, a ball bearing 125, and a bearing 128. The bevel gear 118 is rigidly mounted on an undersurface (as shown in FIG. 6) of the external reel 107a and coaxially arranged with it. The bevel gear 119 is mounted on the transmitting shaft 120, which is parallel to the horizontal axis and carried on bearings 121 an 122 mounted on the rotatable frame 105. The gear 119 interlocks with the bevel gear 118 and the spur gear 123 is mounted on the shaft 120 at the end opposite to the bevel gear 119. The broad width spur gear 124 is rotatably mounted on the shaft 110 through a ball bearing 125 mounted thereon, and interlocks to the gears 123 and 126. The spur gear 126 is mounted on the shaft 127, which is carried on the bearing 128 mounted on the raised portion 104b. The spur gear 129 is mounted on the shaft which is parallel to the horizontal axis, and interlocks to the spur gear 130 mounted on a shaft (not shown). The gear 130 interlocks to the spur gear 131 mounted on a shaft (not shown). The shafts (as described above "not shown") are parallel to the shaft 127. The spur gear 132 is mounted on the shaft 110 and interlocks to the gear 133, which is coaxially mounted on the shaft with the gear 131.

The means 108 is then operated to transmit the rotation of the external reel 107a to the shaft 110 in gear ratio which is defined by those gearing mechanisms. A tube 134 is disposed on the rotatable frame for guiding the spring steel wire 112 from the internal reel to the external reel.

The spring steel wire wound on a body of the internal reel 107b is delivered through the tube 134 to the periphery of the external reel and then led to the delivery port 106 via the periphery of the guide reel 114. The spring steel wire further penetrates the delivery port and is led toward the mandrel 102.

Situated between the delivery port and the mandrel is a training machine 135 for training the unwound spring steel wire in straight and a pair of rollers 136 and 137 are also situated therebetween in order to feed the spring steel wire to the mandrel.

In the operation, in the first place, the preceding end of the spring steel wire is rigidly wound around the mandrel and the spring steel wire is gradually wound round of the mandrel by the rotation of the mandrel driven by a motor (not shown) in such a way that adjacent turns of the spring steel wire on a periphery of the mandrel are in close contact with each other. In this case, the reel 107 is rotated around the shaft 111 by drawing the wire and the rotatable frame 105 is then rotated around the horizontal axis in coaxial relation to the shafts 109 and 110 in gear ratio through the gearing mechanism. As the result, the coiling steel wire is imparted with torsional moment.

In this arrangement, instead of the gearing mechanism, the means 108 may be replaced by a suitable means for driving the rotatable frame in synchronous rotation corresponding to that of the mandrel in the selected rotating ratio.

While the invention has been described in connection with some preferred embodiments thereof, the invention is not limited thereto and includes any modifications and alterations which fall within the true spirit and scope of the invention as defined in the appended claims.

What is claimed is:

1. A method of manufacturing an extension spring, comprising the steps of winding a spring steel wire around a mandrel extending from delivery means located a short distance therefrom and simultaneously imparting an additional torsional stress by rotating that portion of the wire between the delivery means and the mandrel which is not yet wound on the mandrel in a direction opposite to that in which torsional stress is created by the winding with the periphery of the extending wire sliding over the wound wire portion most adjacent thereto so as to generate a counter-rotation against the torsional rotation applied to the extending spring wire which is not yet wound causing a great initial tension to remain in the spring.

2. A method of manufacturing an extension spring according to claim 1 in which a delivery line of the spring steel wire drawn from the delivery means to the mandrel is normal to the axis of the mandrel while tilting the wire toward the preceding wound portion.

3. A method as claimed in claim 1 wherein the angle of torsion imparted to the steel spring wire is calculated as follows:

$$\phi = \frac{Z.L.\tau}{G.d}$$

wherein, $\phi$: angle of torsion (radian)
L: length of the spring steel line (mm.)
$\tau$: torsion stress (kg./mm.$^2$)
G: modulus of transverse elasticity (kg./mm.$^2$)
d: the diameter of the spring steel wire (mm.)
Z: modulus of section.

4. A coiling device for manufacturing an extension spring by winding a spring steel wire around a mandrel, comprising:

(a) a rotatable wire receiving mandrel (102) to receive a wire fed thereto and have it wound thereon;
(b) a rotatable frame (105) spaced from said mandrel with an end opposite said mandrel;
(c) a reel rotatably mounted on said rotatable frame for rotation about an axis normal to the axis of rotation of said frame said reel holding a wire fed to said mandrel;
(d) a wire delivery port on said frame positioned on the frame rotating axis at said end opposite said mandrel;
(e) gearing means to impart a controlled predetermined rotation to said frame as said wire is fed from said reel and is rotated around the mandrel, imparting a torsional stress by rotating that portion of the wire between the reel and the mandrel which is not yet wound around the mandrel in a direction opposite to that in which the torsional stress is applied, with the periphery of the fed wire sliding over the wound wire portion most adjacent thereto so as to generate a counter-rotation against the torsional rotation applied to the fed spring wire which is not wound so as to cause a great initial tension to remain in the spring.

References Cited

UNITED STATES PATENTS 1,538,161  5/1925  Bourn _____ 72—142
2,567,537  9/1951  Workman _____ 140—149

CHARLES W. LANHAM, Primary Examiner
R. M. ROGERS, Assistant Examiner

U.S. Cl. X.R.
72—64; 140—149